United States Patent
Woo et al.

(10) Patent No.: US 8,674,985 B2
(45) Date of Patent: Mar. 18, 2014

(54) METHOD, MEDIUM, AND SYSTEM RENDERING 3D GRAPHIC DATA TO ENHANCE IMAGE QUALITY OF TRANSPARENT OBJECTS

(75) Inventors: Sang-oak Woo, Anyang-si (KR); Hee-sae Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 963 days.

(21) Appl. No.: 11/889,322

(22) Filed: Aug. 10, 2007

(65) Prior Publication Data
US 2008/0094395 A1    Apr. 24, 2008

(30) Foreign Application Priority Data
Oct. 18, 2006    (KR) .................. 10-2006-0101578

(51) Int. Cl.
*G06T 15/50*    (2011.01)
*G06T 15/40*    (2011.01)

(52) U.S. Cl.
USPC ......................................... 345/421; 345/426

(58) Field of Classification Search
None
See application file for complete search history.

(56) References Cited

U.S. PATENT DOCUMENTS

| | | | |
|---|---|---|---|
| 5,706,479 A * | 1/1998 | Winner et al. | 345/543 |
| 6,480,192 B1 * | 11/2002 | Sakamoto et al. | 345/419 |
| 6,570,565 B1 * | 5/2003 | Park et al. | 345/421 |
| 6,654,011 B1 * | 11/2003 | Dreyfus | 345/420 |
| 6,670,955 B1 * | 12/2003 | Morein | 345/421 |
| 6,828,985 B1 * | 12/2004 | Long et al. | 345/620 |
| 7,151,546 B1 * | 12/2006 | Louveaux | 345/619 |
| 7,170,515 B1 * | 1/2007 | Zhu | 345/422 |
| 7,310,098 B2 * | 12/2007 | Ohba | 345/428 |
| 7,388,589 B2 * | 6/2008 | Monahan | 345/581 |
| 2003/0117403 A1 * | 6/2003 | Park et al. | 345/503 |
| 2006/0103647 A1 * | 5/2006 | Andrews | 345/422 |

OTHER PUBLICATIONS

Abraham Mammen, "Transparency and Antialiasing Algorithms Implemented with the Virtual Pixel Maps Technique," IEEE Computer Graphics and Applications, pp. 43-55, Jul./Aug. 1989.*

* cited by examiner

*Primary Examiner* — Daniel Hajnik
(74) *Attorney, Agent, or Firm* — Staas & Halsey LLP

(57) ABSTRACT

A method, medium, and system rendering 3-dimensional (3D) graphic data. The method of rendering 3D graphic data may include grouping objects from among transparent objects included in graphic data, which overlap each other in a 3D space, and rendering the group and remaining objects excluding the grouped objects, in an order determined according to the distance between the group and a viewpoint and the distance between the remaining objects and the viewpoint. In particular, in the rendering of the group, the objects included in the group may be rendered in an order determined according to the distance between each unit element of each object belonging to the group and the viewpoint. By using such a method, medium, and system, rendering picture quality of a transparent object may be improved by avoiding rendering errors.

24 Claims, 12 Drawing Sheets

OPAQUE OBJECT LIST    TRANSPARENT OBJECT LIST

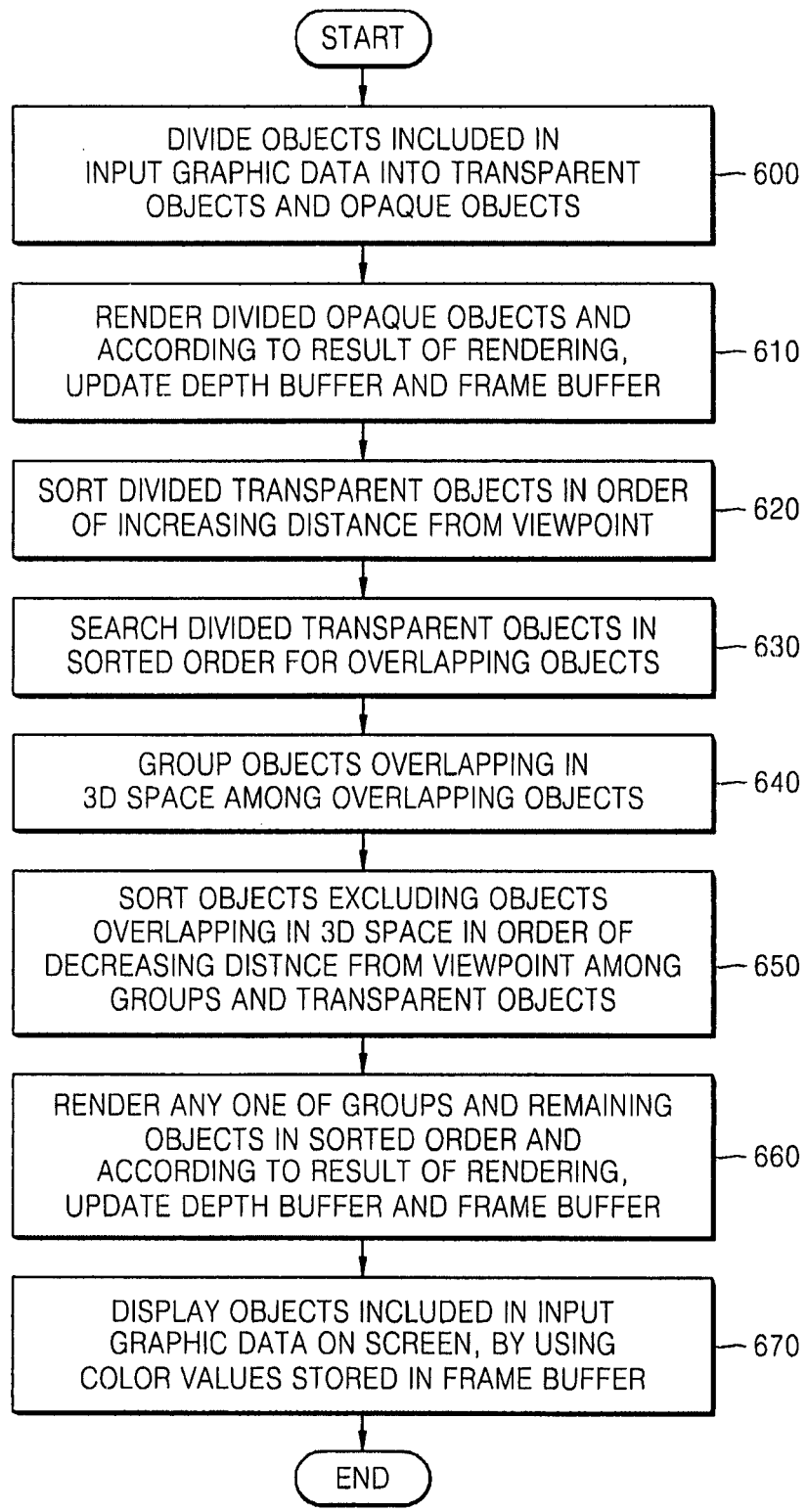

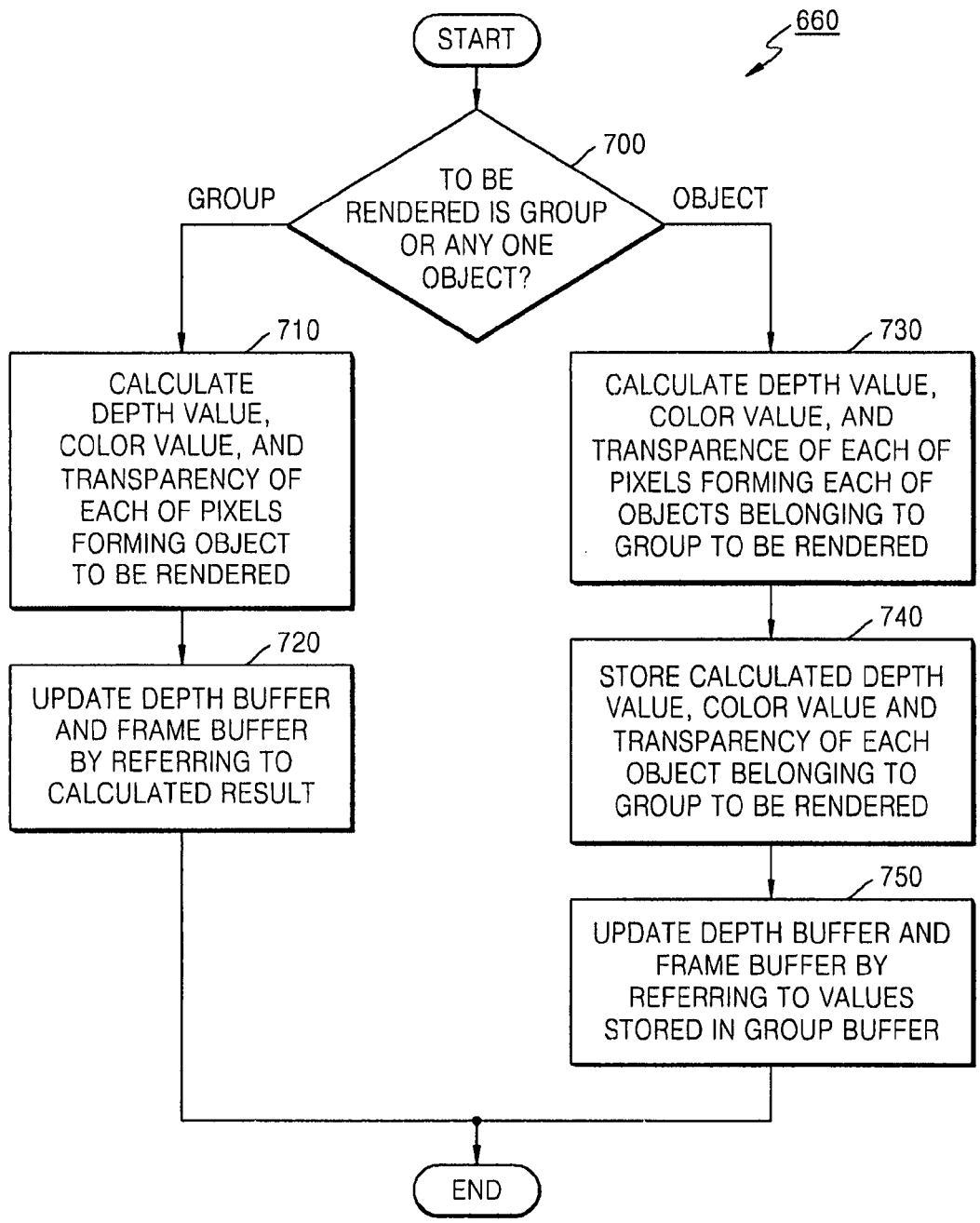

METHOD, MEDIUM, AND SYSTEM RENDERING 3D GRAPHIC DATA TO ENHANCE IMAGE QUALITY OF TRANSPARENT OBJECTS

CROSS-REFERENCE TO RELATED APPLICATIONS

This application claims the benefit of Korean Patent Application No. 10-2006-0101578 filed on Oct. 18, 2006, in the Korean Intellectual Property Office, the disclosure of which is incorporated herein in its entirety by reference.

BACKGROUND OF THE INVENTION

1. Field of the Invention

One or more embodiments of the present invention relate to a method, medium, and system rendering 3-dimensional (3D) graphic data, and more particularly, to a rendering method, medium, and system improving the picture quality of a transparent object when the transparent object is included in input 3D graphic data.

2. Description of the Related Art

Portions of objects included in 3D graphic data may overlap each other depending, on the viewpoint in a 3D space from which 3D objects are viewed. If an opaque object is closer to a projected originating position of the viewpoint, from among the overlapping objects, i.e., positioned in front of other objects when viewed from the screen, portions of objects positioned behind of this opaque object are covered by the opaque object, and thus the covered portions should not be displayed on the screen.

Accordingly, in order to only display objects that are designed to be seen from the viewpoint, a rendering device for rendering 3D graphic data performs a depth test, e.g., by using a depth buffer storing depth values of pixels forming the screen. The depth test is a process for determining whether or not the depth value of a currently rendered object is closer to the screen, i.e., the viewpoint, than the depth value already stored in the depth buffer when it is seen from the particular viewpoint. If the depth test is successful, that is, if the depth value of the currently rendered object represents a depth closer to the screen than the depth value stored in the depth buffer, the rendering device updates the depth value of the depth buffer with the depth value of the current rendered object. Then, the rendering device updates the color values of a frame buffer storing the color values of pixels forming the screen, with the color value of the currently rendered object, corresponding to the update of the depth value of the depth buffer. The update of the depth buffer means that the depth test of the currently rendered object is successful, i.e., that the currently rendered object is closer to the viewpoint and in front of a previously rendered object when looking at the screen. Accordingly, in order to display the currently rendered object on the screen, the color value of the frame buffer is updated with the color value of the currently rendered object.

However, when a transparent object is included in input 3D graphic data, and if an object positioned in front between two objects overlapping each other on the screen is the transparent object and the object positioned at the back is an opaque object, an error may occur in the rendering of the objects because of the rendering order of the objects, thereby degrading the picture quality by incorrectly rendering the graphic data.

FIG. 1 is a reference diagram showing how a rendering error occurs because of the rendering order if a transparent object is included in 3D graphic data. As illustrated in FIG. 1, two triangles 100 and 110 may be displayed on a screen, overlapping each other when they are seen from a particular viewpoint. The triangle 100, positioned in front, is a transparent blue triangle and the triangle 110, positioned behind the triangle 100, is an opaque red triangle. In this case, according to the rendering order of the two triangles 100 and 110, a rendering error may occur.

Here, if the opaque triangle 110 is first rendered and then the transparent triangle 100 is rendered, when the opaque triangle 110 is rendered, the depth buffer and the frame buffer are updated according to the result of rendering. If the transparent triangle 100 is then rendered, the depth value of the opaque triangle 110 stored in the depth buffer is updated with the depth value of the transparent triangle 100 because the depth value of each pixel forming the transparent triangle 100 is less than the depth value of each pixel forming the opaque triangle 110, i.e., because the transparent triangle 100 is closer to the view point. Thus, corresponding to this update, the color value of the opaque triangle 110 stored in the color buffer is updated with a color that is seen when the opaque red triangle 110 is seen through the transparent blue triangle 100, for example, a violet color, by referring to the color value and transparency of the triangle 100.

However, if the front triangle 100 is first rendered and then the rearward opaque triangle 110 is rendered, the depth value of each pixel forming the opaque triangle 110 is greater than the depth value of each pixel forming the transparent triangle 100, and thus the depth buffer is not updated and, corresponding to this, neither is the color buffer. Accordingly, in this case, only the transparent blue triangle is displayed on the screen, thereby causing a rendering error.

In order to solve this, a technique has been designed in which objects included in 3D graphic data are rendered in an order of decreasing distances from a viewpoint at which the 3D objects are seen in a 3D space. However, even according to this technique, the rendering order among objects is determined according to the distance from the center or centroid of an object and a viewpoint. If a transparent object included in the 3D graphic data overlaps another object in a 3D space, rendering errors will again occur.

For example, according to this technique, if object A and object B overlap in a 3D space and the center of object A is closer to a viewpoint than the center of object B, object A is rendered earlier than object B. Accordingly, the pixels of object B positioned behind the pixels of object A will not be displayed on the screen. That is, since the depth buffer is updated with the pixel values of object A, the pixels of object B having depth values greater than the depth values stored in the depth buffer will not be considered. If object A is an opaque object, as noted above, this should not cause a problem. However, if object A is a transparent object, even though object B is positioned behind object A, object B should preferably be displayed on the screen through object A, but according to the rendering order, the aforementioned rendering error occurs.

Thus, as described above, if a transparent object included in 3D graphic data overlaps another object in a 3D space, even though the objects are rendered in the order of decreasing distance between an object and a viewpoint, a rendering errors still occur, thereby degrading the picture quality.

SUMMARY

One or more embodiments of the present invention provide a rendering method, medium, and system improving the picture quality of transparent objects by rendering 3-dimensional (3D) graphic data including a transparent object with minimized error.

Additional aspects and/or advantages of the invention will be set forth in part in the description which follows and, in part, will be apparent from the description, or may be learned by practice of the invention.

To achieve the above and/or other aspects and advantages, embodiments of the present invention include a rendering method, including selectively grouping transparent objects, from among a plurality of objects, which overlap each other in a 3-dimensional (3D) space, and rendering the grouped objects and remaining objects, of the plurality of objects not grouped into the grouped objects by the selective grouping of transparent objects, according to an order based on respective distances between each object in the grouped objects and a viewpoint and the respective distances between the remaining objects and the viewpoint, wherein in the rendering of the grouped objects and the remaining objects, objects included in the grouped objects are rendered according to an order based on respective distances between the viewpoint and each unit element forming each object included in the grouped objects.

To achieve the above and/or other aspects and advantages, embodiments of the present invention include a rendering system, including a grouping unit to selectively group transparent objects, from among a plurality of objects, which overlap each other in a 3D space, and a rendering unit to render the grouped objects and remaining objects, of the plurality of objects not grouped into the grouped objects by the selective grouping of transparent objects, according to an order based on respective distances between each object in the grouped objects and a viewpoint and respective distances between the remaining objects and the viewpoint, wherein the rendering unit renders the grouped objects according to an order based on respective distances between the viewpoint and each unit element forming each object included in the grouped objects.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 6 illustrates a rendering method, according to an embodiment of the present invention; and FIG. 7 illustrates an update operation, such as that illustrated in FIG. 6, according to an embodiment of the present invention.

DETAILED DESCRIPTION OF THE PREFERRED EMBODIMENTS

Figure 1:
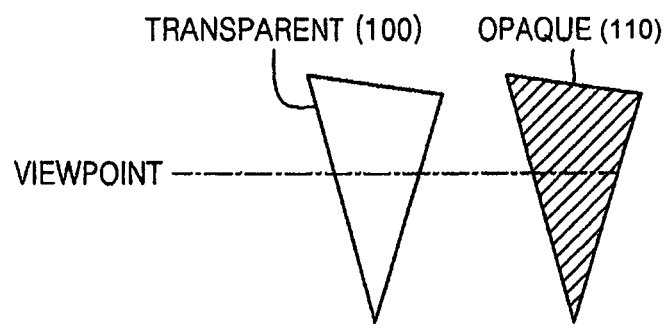
FIG. 1 is a reference diagram showing how a rendering error occurs because of the rendering order if the rendered graphic data includes a transparent object.

Reference will now be made in detail to embodiments of the present invention, examples of which are illustrated in the accompanying drawings, wherein like reference numerals refer to the like elements throughout. Embodiments are described below to explain the present invention by referring to the figures.

One or more embodiments of the present invention can be applied to a system in which, in order to enhance the rendering efficiency of 3-dimensional (3D) graphic data, 3D objects included in 3D graphic data are sorted in units of objects according to the distance between an object and a viewpoint, and the objects included in the 3D graphic data are sequentially rendered according to the sorted order. Conventionally, when the 3D graphic data is rendered after the rendering order is determined as described, in units of objects, if 3D objects including a transparent object overlap in a 3D space, an error may occur.

Figure 2A:
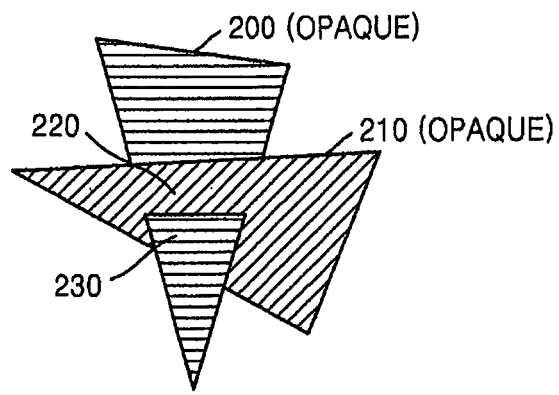
FIGS. 2A through 2C are reference diagrams showing how a rendering error occurs because of the rendering order if the transparent objects of the rendered graphic data overlap each other in a 3-dimensional (3D) space.
Figure 2B:
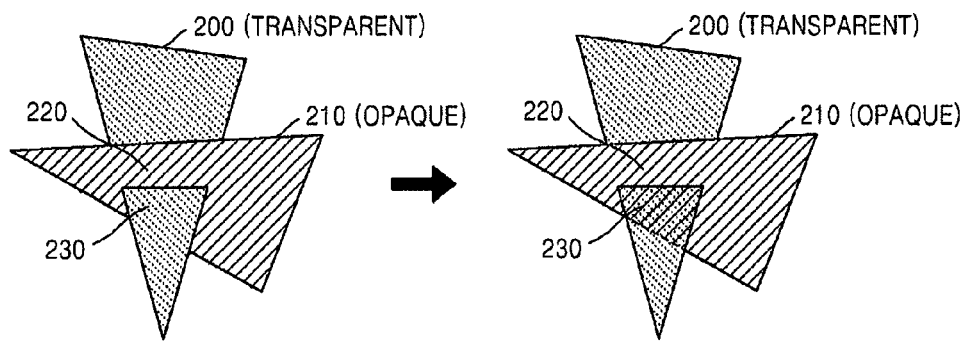
Figure 2C:
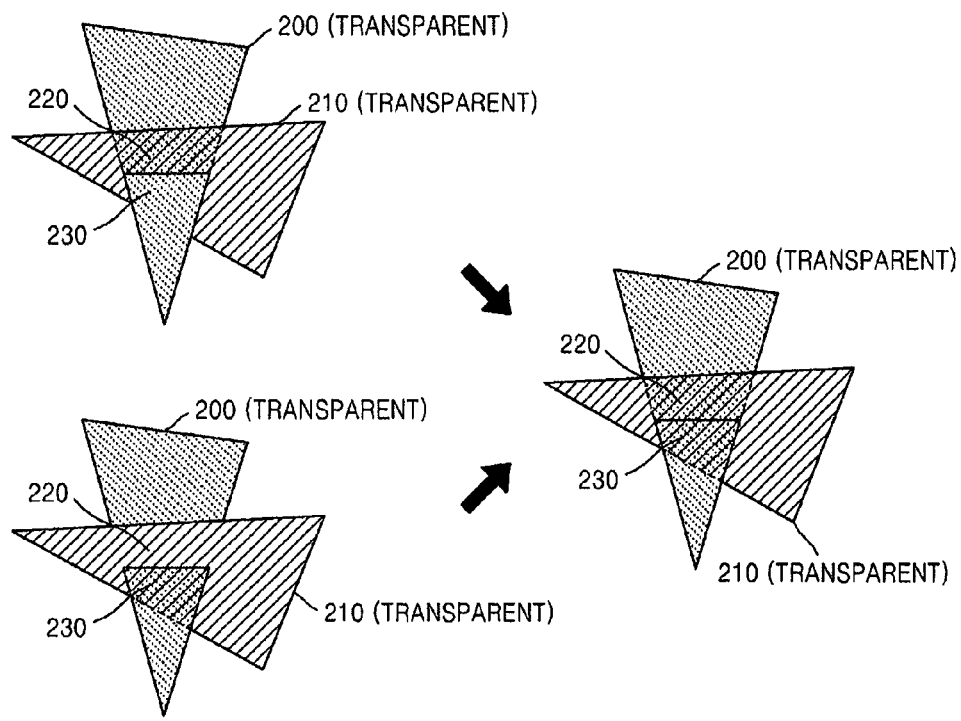

FIGS. 2A through 2C are reference diagrams showing how rendering errors occur because of the rendering order, if transparent objects overlap each other in a 3D space. FIGS. 2A through 2C show the cases where 3D graphic objects, including transparent objects, overlap in a 3D space. More particularly, as illustrated in FIGS. 2A through 2C, a blue triangle 200 and a red triangle 210 are shown as overlapping in a 3D space. Referring to FIG. 2A, according to a viewpoint from which 3D objects are seen, the red triangle 210 is closer to the viewpoint in one area 220, of the overlapping areas 220 and 230, and the blue triangle 200 is closer to the viewpoint in the other area 230, of the overlapping areas 220 and 230.

FIG. 2A illustrates a result of rendering these two triangles 200 and 210 when both the blue triangle 200 and the red triangle 210 are opaque. In this case, since both triangles 200 and 210 are opaque, when displaying the areas 220 and 230 where the two triangles 200 and 210 overlap, the area 220 where the red triangle 210 is positioned in front should be displayed as red, and the area 230 where the blue triangle 200 is positioned in front should be displayed as blue. When both the two triangles 200 and 210 are opaque, whichever triangle is first rendered, an accurate result of rendering as illustrated in FIG. 2A can be obtained. This is because, whichever triangle is first rendered in the areas 220 and 230, where the two triangles 200 and 210 overlap, an object corresponding to a pixel having a depth value closer to the viewpoint between the two triangles 200 and 210 is displayed on the screen.

However, as will be explained below and similar to that discussed above, when one of the two triangles 200 and 210 is transparent or when both the two triangles 200 and 210 are transparent, the result of rendering may vary according to the rendering order, thereby causing a rendering errors.

FIG. 2B illustrates the case where the blue triangle 200 of the two triangles 200 and 210 is transparent. The left illustration of FIG. 2B shows a rendering result when the transparent blue triangle 200 is first rendered and then the opaque red triangle 210 is rendered. The right illustration of FIG. 2B shows a correct rendering in which the transparent blue triangle 200 and the opaque red triangle 210.

If the transparent blue triangle 200 is first rendered, the depth buffer and the color buffer corresponding to the area of the triangle area 200 are updated with the depth value and color value of the triangle 200. Then, if the opaque red triangle 210 is rendered, in the non-overlapping areas and the overlapping areas 220 and 230, the depth buffer and the color buffer corresponding to the area 220 where the red triangle 210 is positioned in front are updated with the depth value and color value of the red triangle 210. However, in the overlapping areas 220 and 230, the depth buffer and the color buffer corresponding to the area 230 where the blue triangle 200 is positioned in front are not updated. Accordingly, in the rendering shown in the left illustration of FIG. 2B, only the color of the blue triangle 200 is displayed in the area 230 where the blue triangle 200 is positioned in front. However, in the case where the rendering is correctly performed, as shown in the right illustration of FIG. 2B, even when the blue triangle 200 is positioned in front of the red triangle 210, the red triangle 210 should be displayed on the screen because the blue triangle 200 is transparent and the red triangle 210 should be seen through the blue triangle 200. As described above, when the opaque object and the transparent object overlap in the 3D space, if the transparent object is first rendered, a rendering error can occur.

FIG. 2C illustrates the case where both the two triangles 200 and 210 are transparent. The upper left illustration of FIG. 2C shows a rendering result when the blue triangle 200 is first rendered, and the bottom left illustration shows a rendering result when the red triangle 210 is first rendered. The right illustration of FIG. 2C shows a correct rendering result without an error when both triangles 200 and 210 are transparent. As shown in the right illustration of FIG. 2C, when both the blue triangle 200 and the red triangle 210 are transparent, no matter which triangle is positioned in front, the overlapping areas 220 and 230 can be seen through each other. Accordingly, in the overlapping areas 220 and 230 a color that is seen when the red triangle 210 is seen through the blue triangle 200 should be displayed in the area 220 of the screen where the red triangle 210 is positioned in front and a color that is seen when the blue triangle 200 is seen through the red triangle 210 should be displayed in the area 230 where the blue triangle 200 is positioned in front. However, as shown on the upper left illustration of FIG. 2C, if the blue triangle 200 is first rendered, in the area 200 where the red triangle 210 is positioned in front, the rendering result of the red triangle 210 is added to the rendering result of the blue triangle 200, thereby updating the color buffer. However, in the area 230 where the blue triangle 200 is positioned in front, the depth buffer and the color buffer are not updated, and thus the red triangle 210 seen through the blue triangle 200 will not be considered, thereby causing a rendering error.

Likewise, as shown in the bottom left illustration of FIG. 2C, if the red triangle 210 is first rendered, in the areas 220 and 230, the rendering result of the blue triangle 200 is added to the rendering result of the red triangle 210, thereby updating the color buffer in the area 230 where the blue triangle 200 is positioned in front. However, in the area 220 where the red triangle 210 is positioned in front, the depth buffer and the color buffer are not updated, and thus the blue triangle 200 seen through the red triangle 210 will not be considered, thereby causing a rendering error.

As described above, when transparent objects overlap in the 3D space, the rendering results vary according to the rendering order, and in addition, whichever rendering order is followed, a rendering error can occur, thereby degrading the rendering picture quality. Accordingly, one or more embodiments of the present invention suggest a 3D graphic data rendering method, medium, and system capable of obtaining an accurate result of rendering even when a transparent object included in 3D graphic data overlaps another object in a 3D space.

Figure 3:
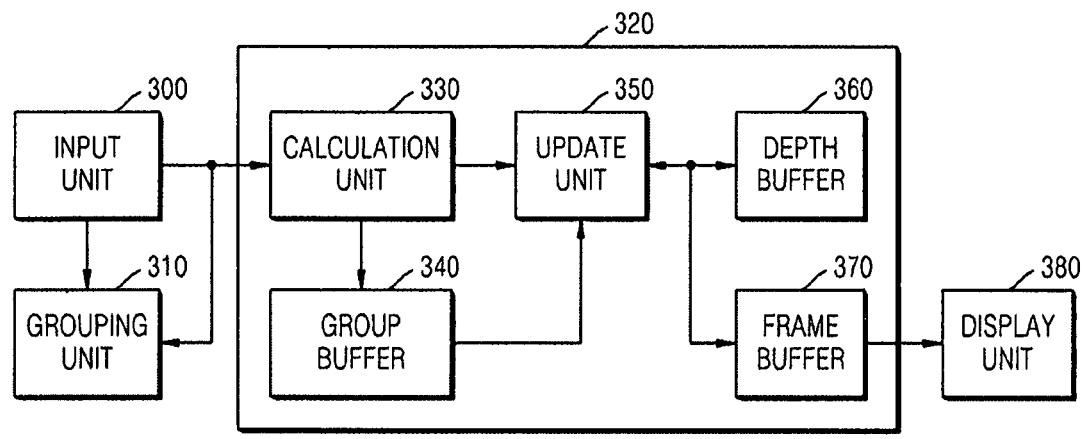
FIG. 3 illustrates a rendering system, according to an embodiment of the present invention.

FIG. 3 illustrates a rendering system, according to an embodiment of the present invention. The system may include an input unit 300, a grouping unit 310, a rendering unit 320 and a display unit 380, for example. The rendering unit 320 may include a calculation unit 330, a group buffer 340, an update unit 350, a depth buffer 360 and a frame buffer 370, for example.

The input unit 300 may receive an input of to be rendered 3D graphic data and divide objects included in the 3D graphic data into transparent objects and opaque objects.

Figure 4A:
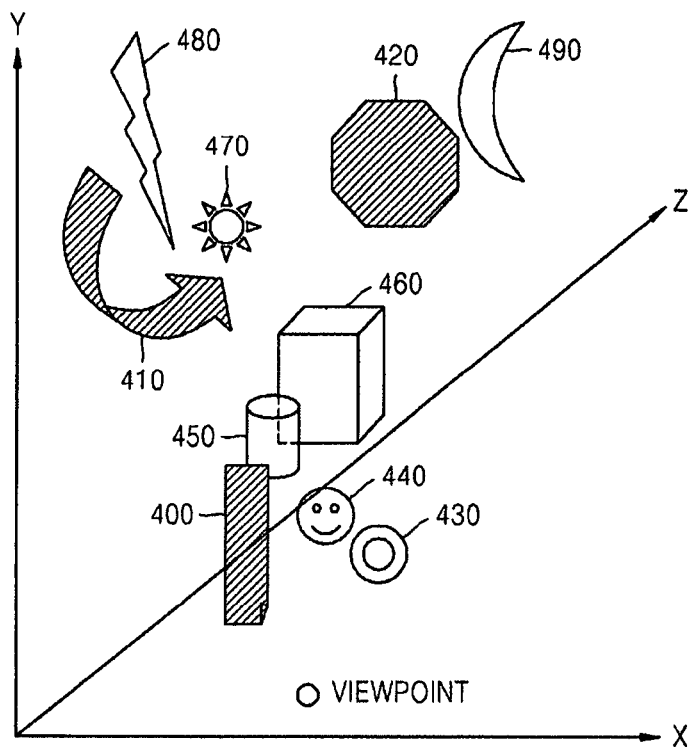
FIGS. 4A through 4G illustrate reference diagrams explaining an operation of a rendering system, such as that illustrated in FIG. 3, according to an embodiment of the present invention.
Figure 4B:
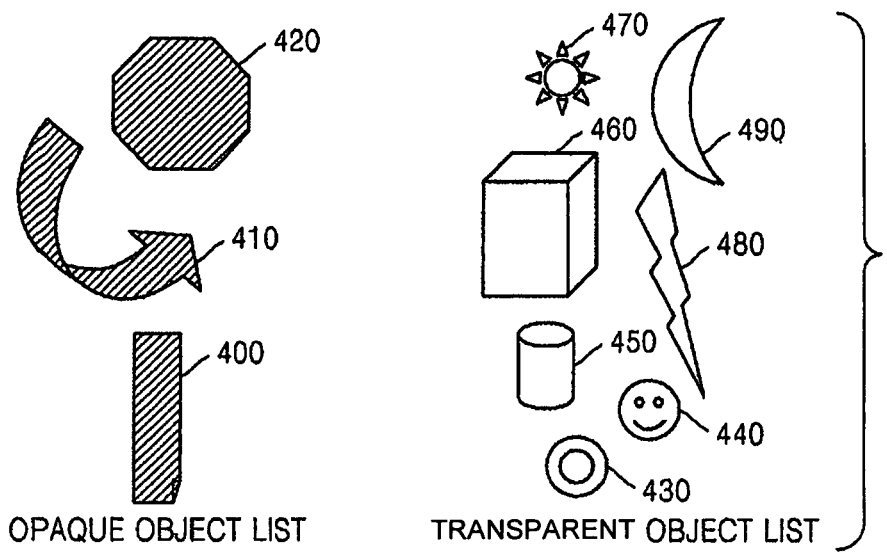

FIG. 4A shows how 3D objects 400 through 490, e.g., included in graphic data input by way of the input unit 300, are positioned in a 3D space based on a world coordinate system. FIG. 4B illustrates a result of dividing the 3D graphic objects 400 through 490 into transparent objects 430 through 490 and opaque objects 400 through 420. In this example, the input unit 300 provides the divided transparent objects to the grouping unit 310 objects overlapping in the 3D space may be grouped, and provides the divided opaque objects to the rendering unit 320 so the objects may be rendered.

The grouping unit 310 may group objects overlapping in the 3D space, from among the transparent objects provided from the input unit 300. For example, the grouping unit 310 may group objects overlapping each other, from among transparent objects, into one group. Accordingly, as the result of the grouping, at least one or more groups, grouping objects overlapping each other, can be generated according to respective positions of the transparent objects.

The grouping unit 310 may determine whether the bounding volumes of transparent objects overlap, thereby determining whether the transparent objects overlap in the 3D space. However, determining whether each of all the transparent objects overlaps another transparent object requires an excessive amount of computation. Therefore, according to an embodiment of the present invention, the grouping unit 310 may sort the transparent objects according to their distances from a viewpoint, that is, according to ranges of the depth values of the transparent objects relative to the viewpoint. Then, it may be determined whether the bounding volumes intersect, only between transparent objects whose depth value ranges intersect, thereby enabling objects overlapping in the 3D space to be efficiently found.

For example, the grouping unit 310 may transform the transparent objects into a camera coordinate system, for example, based on the viewpoint from which the 3D objects are seen, and then, sort the transformed transparent objects according to the depth values of the transformed coordinates system. Then, the grouping unit 310 may search the sorted transparent objects for objects whose ranges of depth values overlap, according to the sorting order. Then, the grouping unit 310 may group together the objects overlapping in the 3D space, from among the searched objects.

FIGS. 4C through 4G are reference diagrams explaining a process of grouping objects overlapping in the 3D space, from among the transparent objects 430 through 490 illustrated in FIG. 4B.

Figure 4C:
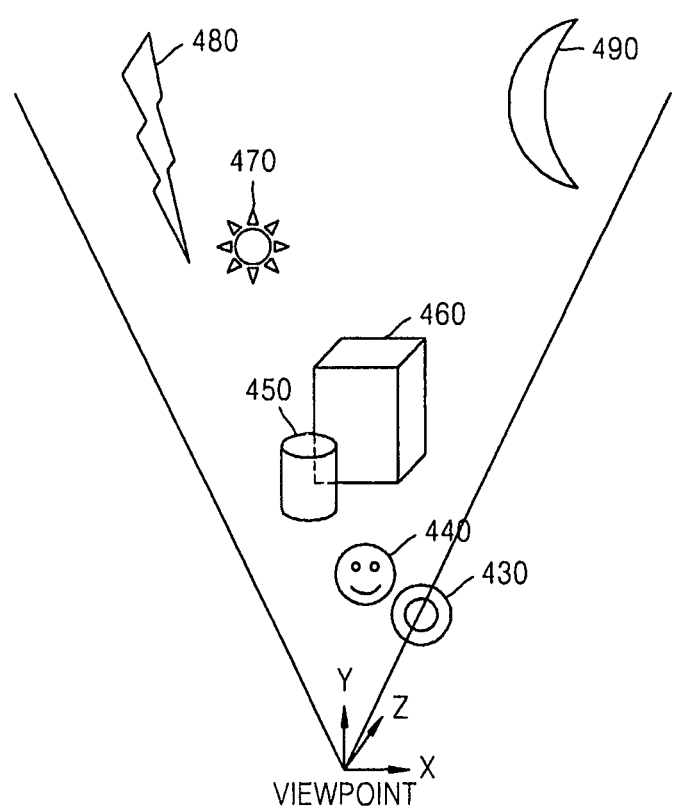
Figure 4D:
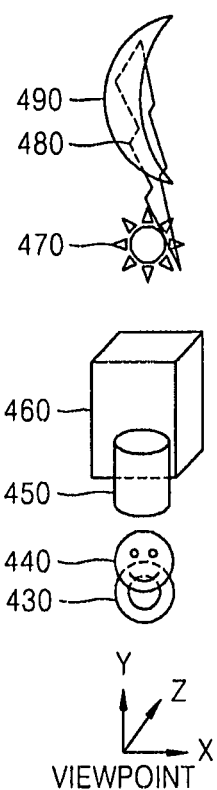
Figure 4E:
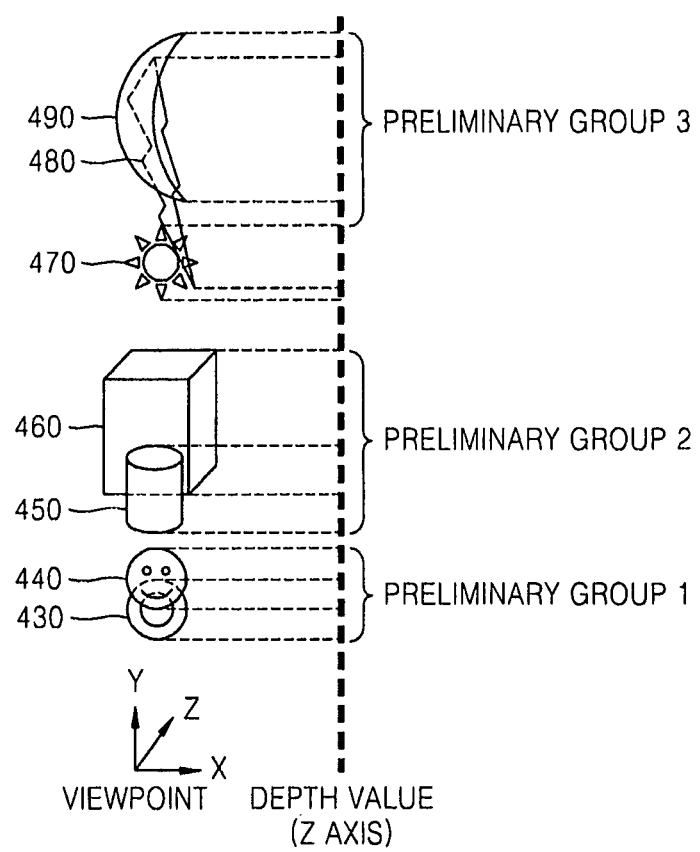
Figure 4F:
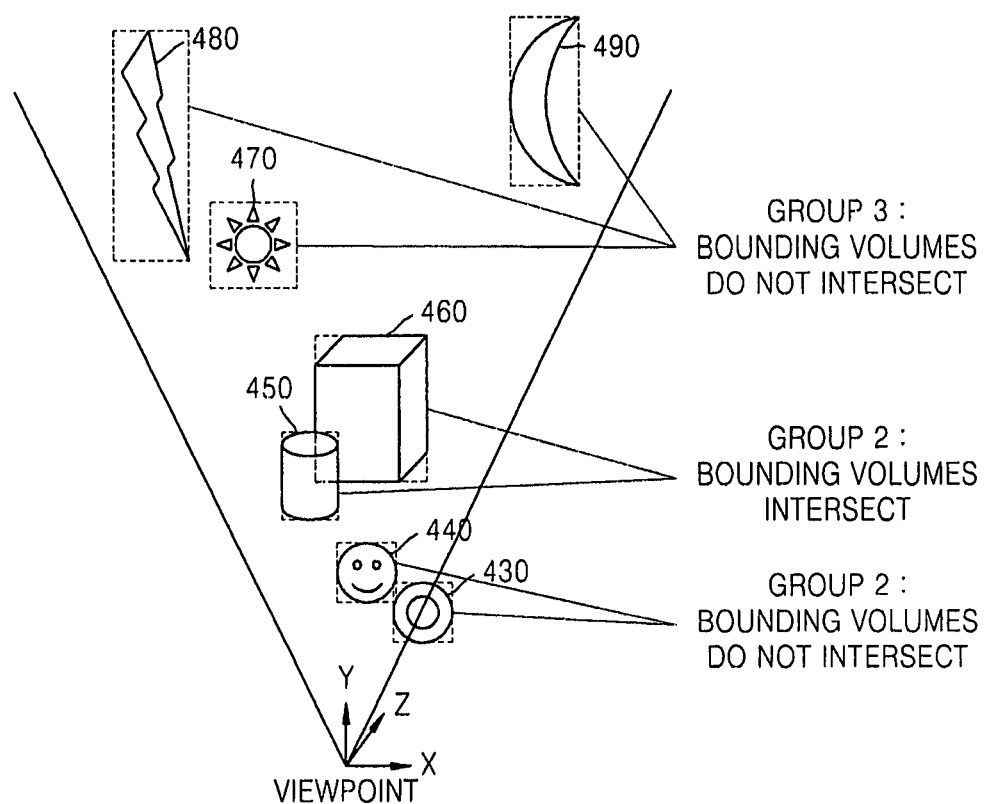

FIG. 4C illustrates a result of a transforming the transparent objects 430 through 490, illustrated in FIG. 4B, into the camera coordinate system, for example. FIG. 4D shows how the transparent objects 430 through 490, transformed into the camera coordinate system, are sorted according to the depth values. FIG. 4E illustrates a result of a searching of the sorted transparent objects 430 through 490 for the objects whose ranges of depth values overlap. FIG. 4F illustrates a result of a grouping together of the objects actually overlapping in the 3D space among the searched objects.

Figure 4G:
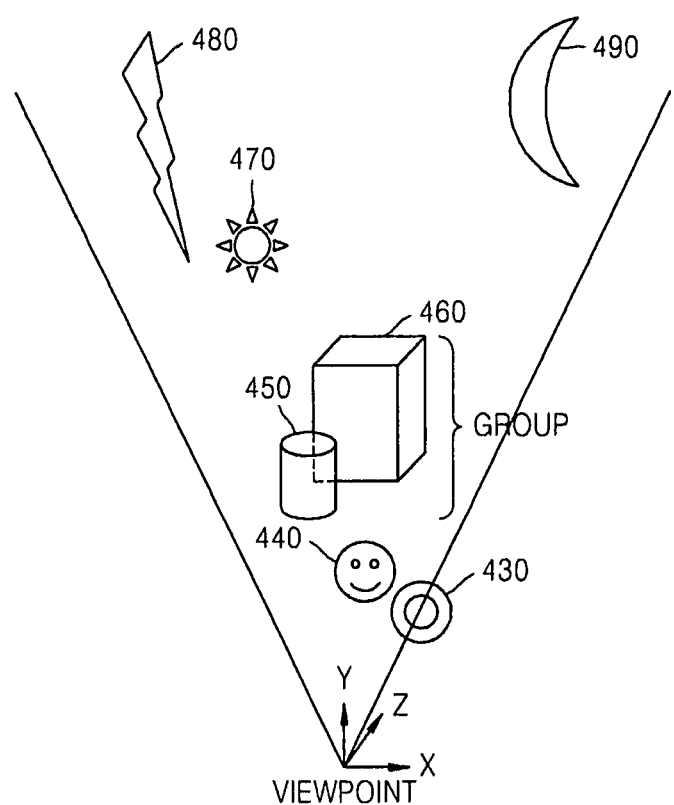

For example, the grouping unit 310 may search, starting from the front, for example, the transparent objects sorted in order of increasing distance from the viewpoint, for objects whose ranges of depth values intersect. Here, the distance between an object and the viewpoint may be the distance between the center or centroid of the object and the viewpoint, or in some cases, may be the shortest distance between the viewpoint and the object. In the embodiment illustrated in FIG. 4E, the grouping unit 310 would search for an object 440 whose range of depth values overlaps that of the object 430 at the front. If no more objects whose range of depth values overlap that of the front object 430 is found, the grouping unit 310 may search for an object 460 whose range of depth values overlaps that of the next object 450. If no more objects whose range of depth values overlap that of the object 470, the grouping unit 310 may again search for an object 480 and 490 whose range of depth values overlaps that of the next object 470. Then, the grouping unit 310 groups objects 450 and 460, whose bounding volumes actually intersect in the 3D space, as one group. Among the objects searched for in FIG. 4E, the objects 430, 440, 470 through 490 whose ranges of depth value intersect with those of their respective reference objects, but whose bounding volumes do not actually intersect with those of the reference objects in the 3D space, are not grouped. FIG. 4G illustrates a generated result of grouping the objects whose bounding volumes actually intersect in the 3D space, from among the objects searched for in FIG. 4E, as one group.

After the grouping process is finished, for example, the grouping unit may provide the group and the remaining transparent objects, excluding this generated group, to the rendering unit 320. At this time, according to the sorting order of the transparent objects, to group the transparent objects, the grouping unit 310 may provide at least one or more groups generated in the grouping unit 310, and the remaining objects, to the rendering unit 320. The grouping unit may provide the groups and the remaining objects to the rendering unit 320 in order of decreasing distance between the viewpoint and the groups and the remaining objects. In this case, even without separately sorting the groups and the remaining objects in order of decreasing distance, the rendering unit 320 can render the groups and the remaining objects in the order in which the groups and the remaining objects are provided from the grouping unit 310, thereby rendering the groups and the remaining objects in order of decreasing distance.

The rendering unit 320 may render the opaque objects provided from the input unit 300 and the transparent objects provided from the grouping unit 310. As described above with reference to FIG. 2B, when a transparent object and an opaque object overlap in the 3D space, if the transparent object is first rendered, a rendering error can occur. Accordingly, the rendering unit 320 may first render opaque objects and then render transparent objects.

Since the rendering process of opaque objects may be similar to that of transparent objects, such a process according to an embodiment of the present invention will only be explained briefly. The rendering unit 320 may render each opaque object and, according to the result of the rendering, update the depth value of each pixel stored in the depth buffer 360 and the color value of each pixel stored in the frame buffer 370. The depth buffer 360 may be a type of storage device storing the depth value of each pixel forming the screen displaying objects included in 3D graphic data. Similarly, the frame buffer 370 may be a type of storage device storing the color value and transparence of each pixel forming the screen correspondingly to the depth buffer 360. For example, when information on transparency is not required, as in the case where 3D objects that are to be rendered are all opaque objects, only a color value, excluding a transparency value, can be stored in the frame buffer 370. However, if a transparent object is included in the 3D graphic data, the transparency as well as the color value should be stored in a separate buffer, for example, or the frame buffer 370, thereby enabling the picture quality with the transparent objects to be accurately expressed.

Figure 5:
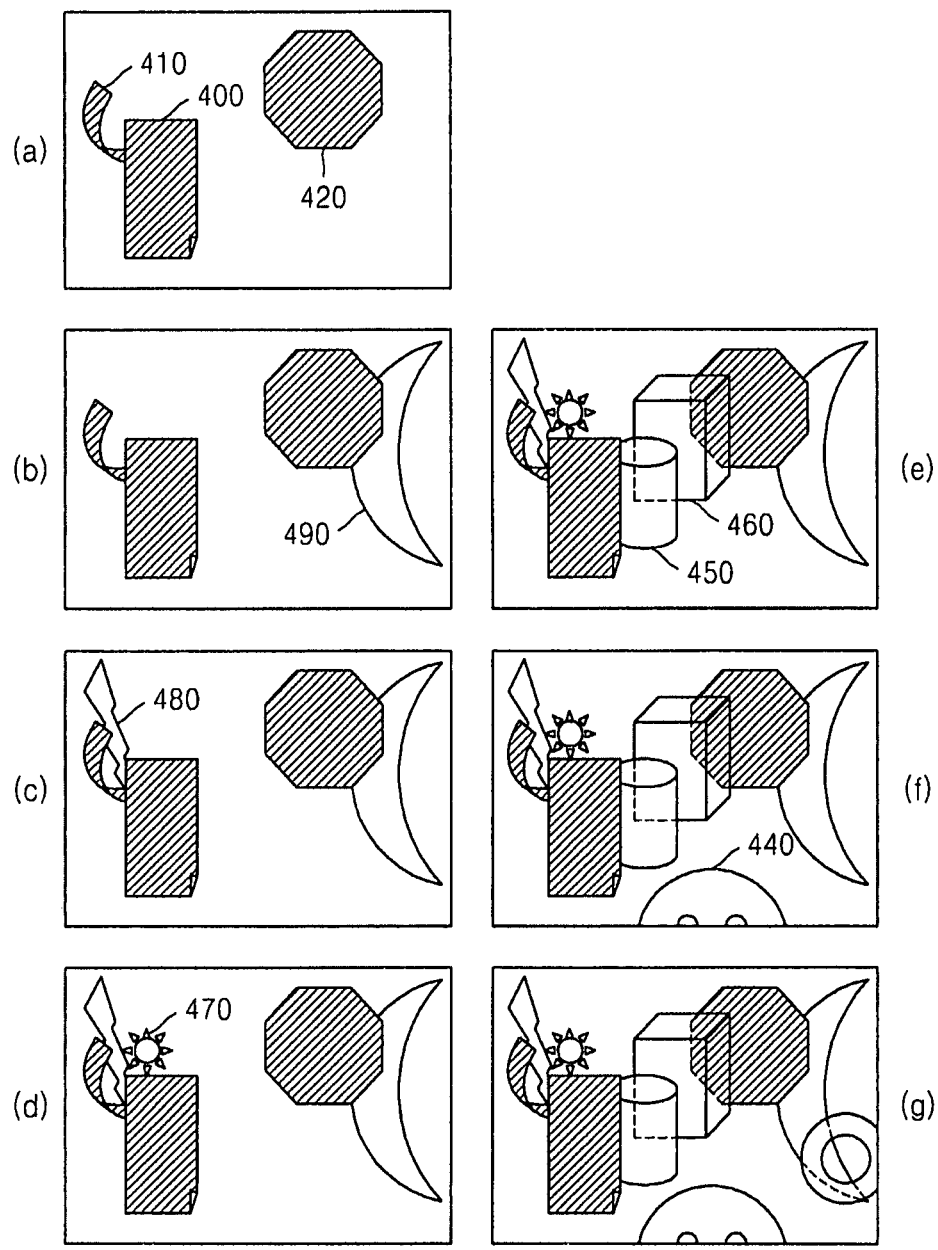
FIG. 5 illustrates a reference diagram explaining a process of rendering 3D graphic data, e.g., in a rendering system such as that illustrated in FIG. 3, according to an embodiment of the present invention.

Illustration (a) in FIG. 5 shows a color value of each pixel stored in the frame buffer 370 after the rendering unit 320 renders the opaque objects 400 through 420 included in the 3D objects 400 through 490 included in the 3D graphic data input in FIG. 4A, for example, according to an embodiment of the present invention. As described above, since only an object corresponding to a pixel closest to the viewpoint, from among opaque objects, may be displayed on the screen, the 3D graphic data may always be rendered accurately regardless of the rendering order.

The rendering unit 320 may render the opaque objects and then the transparent objects. This is because if the opaque objects are rendered before the transparent objects, the above-mentioned problems caused by the transparent object and the opaque object overlapping in the 3D space, can be avoided; if the transparent object is first rendered, a rendering error can occur.

In addition, according to an embodiment of the present invention, among the at least one or more groups bound in the grouping unit 310 and the remaining transparent objects, the rendering unit 320 may sort the remaining objects, excluding those in the at least one or more groups, in order of decreasing distance from the viewpoint, and according to the sorted order, the rendering unit 320 may extract and render any one group from the at least one or more groups, or any one object among the remaining objects. Here, by rendering the transparent objects, excluding the opaque objects among the 3D objects, in order of decreasing distance from the viewpoint, the occurrence of a rendering error may be avoided.

For example, when a transparent object is in front of another transparent object in a 3D space, the rearward transparent object should be displayed on the screen through the front transparent object. However, if the transparent objects are rendered in order of increasing distance from the viewpoint, the depth value of the object which is first rendered indicates that the object is closer to the viewpoint than the object which is rendered later. Accordingly, the above-mentioned depth test of the later rendered object fails, and the depth buffer 360 and the frame buffer 370 are not updated. That is, the desired effect of a later rendered object being seen through a first rendered object will not be achieved. However, if the transparent objects are rendered in order of decreasing distance from the viewpoint, the depth value of the depth buffer 360 is updated sequentially in order of decreasing distance from the viewpoint and corresponding to this, the color value of the frame buffer 370 is also updated in order of decreasing distance from the viewpoint, by referring to the color value and transparency of each transparent object. That is, the desired effect of a later rendered rearward object being seen through a frontward object, displayed on the screen in order of decreasing distance from the viewpoint, can be achieved.

Illustrations (b) through (g) of FIG. 5 respectively show the color value of each pixel stored in the frame buffer 370 according to the rendering result of rendering the group or objects in order of decreasing distance from the viewpoint. Illustration (b) in FIG. 5 shows the state of the frame buffer 370 after the rearmost object 490, from among the transparent objects, is rendered. Illustrations (c) and (d) of FIG. 5 show the states of the frame buffer 370 after the next rear objects 480 and 470, respectively, are rendered. Illustration (e) of FIG. 5 shows the state of the frame buffer 370 after the group binding the objects 450 and 460, which overlap in the 3D space, is rendered. Illustrations (e) and (g) of FIG. 5 show the states of the frame buffer 370 after the objects 440 and 430, respectively, which are positioned in front of the group, are sequentially rendered.

A process of rendering transparent objects, according to an embodiment of the present invention, will now be explained in greater detail. Below reference to FIG. 3 will be made merely for explaining this embodiment process, noting that alternative embodiments are equally available.

First, a process of rendering one object of the remaining objects, excluding objects in a group, from among the transparent objects, that is, the objects that do not overlap any transparent objects in the 3D space, will now be explained briefly.

The calculation unit 330, for example, may calculate the depth value, color value and/or transparency of each pixel forming each primitive that forms an object to be rendered. Hereinafter, this process will be referred to as a rasterization process.

The update unit 350 may update the depth buffer 360 and the frame buffer 370 by referring to the calculated depth value, color value and/or transparency of each pixel result. The updating method may be similar to that for rendering an opaque object. The calculated depth value of each pixel is compared with the depth value stored in the depth buffer 360. If the comparison result indicates that the calculated depth value of each pixel is closer to the viewpoint than the depth value of the depth buffer 360, the depth buffer 360 and the frame buffer 370 may be updated by referring to this calculated result.

In the case of an opaque object, the frame buffer 370 may be updated so that a color value already stored in the frame buffer 370 is deleted and the color value of the currently rendered object is stored in the frame buffer 370, for example. However, in the case of a transparent object, the frame buffer 370 may be updated by appropriately mixing the color value already stored in the frame buffer 370 with the color value of the currently rendered object, by referring to the transparency of the currently rendered object.

The mixing of the color value already stored in the frame buffer 370 with the color value of the currently rendered object can be performed according to a variety of mathematical expressions for alpha blending.

A process of rendering a group binding the objects overlapping in the 3D space among transparent objects will now be explained, according to an embodiment of the present invention. An example of a cylinder 450 and a cuboid 460 being bound as a group, as illustrated in FIGS. 4A through 4G, will now be explained.

The calculation unit 330 may calculate the depth value, color value and/or transparency of each pixel forming each primitive that forms each object belonging to one group. According to the embodiment illustrated in FIG. 4G, the calculation unit 330 may calculate the depth value, color value and transparency of each pixel forming the cylinder 450 and the cuboid 460.

The group buffer 340 may be used to render a group bound in the grouping unit 310, and store the depth value, color value and transparency of each object calculated in the calculation unit 330, for example. The grouping unit 310 may include the same number of storage spaces as the number of objects belonging to the group, for example, noting that alternative embodiments are equally available. According to the embodiment illustrated in FIG. 4G, the group buffer 340 has two storage spaces, and in one of the two storage spaces, the depth value, color value, and transparency of each pixel forming the cylinder 450 may be stored, and in the other storage space, the depth value, color value, and transparency of each pixel forming the cuboid 460 may be stored. According to an embodiment of the present invention, the group buffer 340 may store the calculated depth value, color value, and transparency of each object in order of decreasing distance between the viewpoint and the calculated depth value so as to more efficiently perform an updating process in the updating unit, which will be explained below in more detail.

The update unit 350 may update the depth buffer 360 and the frame buffer 370 by referring to the information stored in the group buffer 340. Here, the update unit 350 may extract, from among the depth value of each pixel stored in the group buffer 340, the depth value of a pixel that is closer to the viewpoint than the depth value of the pixel stored in the depth buffer 360. According to the embodiment illustrated in FIGS. 4A through 4G, illustration (d) of FIG. 5 shows the color value of each pixel currently stored in the frame buffer 370, and illustration (e) of FIG. 5 shows the color value of each pixel stored in the frame buffer 370 after the group including the cylinder 450 and the cuboid 460 is rendered. The depth value of the object, as illustrated in illustration (d) of FIG. 5, color value of which is stored in the frame buffer 370 is currently stored in the depth buffer 360. Accordingly, the depth value of a pixel that is closer to the viewpoint than the depth value stored in the depth buffer 360 may be extracted from among the depth value of each pixel stored in the group buffer 340, all the depth values of the two objects 450 and 460, excluding the pixels covered by the rectangle 400, may be extracted, but all the depth values of the two objects 450 and 460 covered by the rectangle 400 may not be extracted.

When all the depth values of the two objects 450 and 460 are extracted, the frame buffer 370 may be updated in order of decreasing distance between the viewpoint and the extracted depth value, by referring to the color value and transparency stored in the group buffer 340 corresponding to each extracted depth value. According to the embodiment illustrated in FIGS. 4A through 4G, in this case, the pixels forming the cuboid 460 are positioned behind of the pixels forming the cylinder 450. Accordingly, the frame buffer 370 may be updated by referring first to the color value and transparency of the cuboid 460 and then referring to the color value and transparency of the cylinder 370.

As described above, when the calculated depth value, color value, and transparency of each object are stored in the group buffer 340, in order of decreasing distance between the viewpoint and the calculated depth value, a process of comparing the magnitudes of extracted depth values and determining an updating order according to the magnitude may not be required. The frame buffer 370 can be sequentially updated in the order in which the depth values are stored in the group buffer 340, thereby efficiently updating the frame buffer 370 by referring to the depth values extracted in order of decreasing distance from the viewpoint.

The rendering unit 320 may render all the input 3D graphic objects and finally provide the color value of each pixel stored in the frame buffer 370 to the display unit 380, for example.

Thus, the display unit 380 may display the result of rendering the input 3D graphic objects by using the provided color value of each pixel stored in the frame buffer 370.

A rendering method according to an embodiment will now be explained with reference to FIG. 6. Here, this rendering method will only be briefly explained, since the method is similar to the above described process of rendering the 3D objects included in the 3D graphic data.

In operation 600, input 3D graphic objects may be divided into transparent objects and opaque objects.

In operation 610, the divided opaque objects may be rendered and a depth buffer and a frame buffer may be updated according to the result of rendering.

In operation 620, the divided transparent objects may be sorted in order of increasing distance from a viewpoint from which the 3D graphic objects are seen.

In operation 630, the divided transparent objects may be searched for objects whose ranges of depth values overlap in the sorted order. At this time, at least one or more groups of objects whose depth values overlap can be searched for.

In operation 640, objects overlapping in a 3D space among the found objects may be grouped.

In operation 650, the group and the remaining transparent objects, excluding the grouped overlapping objects, may be sorted in order of decreasing distance from the viewpoint.

In operation 660, one group or any one object in the sorted order may be rendered and the depth buffer and the frame buffer may be updated according to the result of rendering.

In operation 670, the objects included in the input graphic data may be displayed by using the color value stored in the frame buffer.

Referring to FIG. 7, operation 660, such as shown in FIG. 6, will now be explained in more detail, according to an embodiment of the present invention.

In operation 700, it may be determined whether to render one group or any one object.

In operation 700, if it is determined that one object is to be rendered, operation 710 may be performed, and if it is determined that one group is to be rendered operation 730 may be performed.

In operation 710, the depth value, color value, and/or transparency of each pixel forming the object that is to be rendered may be calculated.

In operation 720, the depth buffer and the frame buffer may be updated by referring to the calculated depth value, color value, and/or transparency result.

In operation 730, the depth value, color value, and/or transparency of each pixel forming each object included in the group that is to be rendered may be calculated.

Here, in each object included in the group that is to be rendered, the depth value, color value, and/or transparency of each pixel forming each primitive that forms the object are calculated.

In operation 740, the calculated depth value, color value, and transparency of each object included in the group that is to be rendered may be stored, e.g., in a group buffer.

In operation 750, the depth buffer and the frame buffer may be updated by referring to the values stored in the group buffer.

According to a rendering method, medium, and system, according to differing embodiments, opaque objects may be first rendered, from among objects included in 3D graphic data, and then, objects that overlap in a 3D space, from among the transparent objects, may be bound as group. Then, with the group and the remaining transparent objects excluded from the groups, a rendering order may be determined in units of objects or groups according to the distance between the viewpoint and the group and objects. Then, the rendering may be performed according to the rendering order.

In the case of rendering the group, the rendering order of the objects included in the group may be determined in units of pixels according to the distance between the viewpoint and the pixel of each object included in the group. Then, the rendering may be performed according to the order, thereby obtaining a result of rendering without a rendering error and improving the picture quality of the transparent objects even when the transparent objects included in the 3D graphic data overlap other objects in the 3D space.

The effect of the improvement in the picture quality of a transparent object, according to a rendering method, medium, and system of an embodiment of the present invention, will now be explained with further reference to FIGS. 2B and 2C. In the case illustrated in FIG. 2B, in an embodiment of the present invention an opaque object is first rendered and then a transparent object is rendered, thereby preventing the rendering error shown on the left illustration of FIG. 2B. In addition, in the case illustrated in FIG. 2C, the depth value, color value, and transparency of each pixel of the two triangles 200 and 210 may be calculated, and the frame buffer updated in order of decreasing magnitudes of the calculated depth value. Accordingly, in the overlapping areas 220 and 230 where the two triangles 200 and 210 overlap, the frame buffer of the area 220, where the blue triangle 200 is positioned behind the red triangle 210, can be updated by referring first to the calculated result of the blue triangle 200, but the frame buffer of the area 230, where the red triangle 210 is positioned behind the blue triangle 200, is updated by referring first to the calculated result of the red triangle 210. As a result, in all, for example, areas 220 and 230 where the two transparent triangles 200 and 210 overlap, the two triangles 200 and 210 can be seen through the other when displayed on the screen. That is, even when transparent objects overlap in a 3D space, a rendering error may be avoided.

Accordingly, such a rendering method, medium, and system, according to an embodiment of present invention, can more accurately render transparent objects included in 3D graphic data, thereby improving the rendering picture quality of transparent objects.

According to such a 3D graphic data rendering method, medium, and system, according to an embodiment of the present invention, objects that overlap in a 3D space, from among the transparent objects, are bound as one group. Then, with the group and the remaining transparent objects excluding the group, a rendering order can be determined in units of objects or groups according to the distance between the viewpoint and the group and objects. Then, the rendering may be performed according to the rendering order.

In the case of rendering the group, the rendering order of the objects included in the group may be determined in units of pixels according to the distance between the viewpoint and the pixel of each object included in the group and then the rendering may be performed according to the determined rendering order. In this way, even when transparent objects included in the 3D graphic data overlap other objects in the 3D space, a result of rendering without an error can be obtained and the picture quality of the transparent objects can be improved.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A rendering method, comprising:
   selectively grouping transparent objects, using at least one processor, from among a previously grouped plurality of transparent objects distinct from a grouping of opaque objects of a plurality of objects including the transparent objects, wherein the selective grouping of the transparent objects is based upon a determination of whether bounding volumes of the transparent objects, whose ranges of depth values overlap each other, intersect in a 3 dimensional (3D) space; and
   rendering the selectively grouped objects and remaining objects, of the previously grouped plurality of transparent objects not grouped into the selectively grouped objects by the selective grouping of transparent objects, according to an order based on respective distances between each object in the selectively grouped objects and a viewpoint and the respective distances between the remaining objects and the viewpoint,
   wherein in the rendering of the selectively grouped objects and the remaining objects, objects included in the selectively grouped objects are rendered according to an order based on respective distances between the viewpoint and each unit element forming each object included in the selectively grouped objects.

2. The method of claim 1, further comprising receiving graphic data comprising the plurality of objects.

3. The method of claim 1, wherein each unit element is a pixel that is a minimum unit forming respective objects.

4. The method of claim 3, wherein, in the rendering of the selectively grouped objects, the selectively grouped objects are rendered according to an order of decreasing distance between respective pixels and the viewpoint.

5. The method of claim 4, wherein the rendering of the selectively grouped objects comprises:
   calculating respective depth values, color values, and transparencies of each pixel forming each object included in the selectively grouped objects; and
   rendering the selectively grouped objects by updating a depth buffer and frame buffer of each respective pixel, according to an order of decreasing distance between the viewpoint and respective calculated depth values of the pixels, by referring to a result of the calculating of the respective depth values, color values, and transparencies of each pixel forming each object included in the selectively grouped objects.

6. The method of claim 5, wherein the rendering of the selectively grouped objects by updating the depth buffer and the frame buffer of each respective pixel comprises:
   extracting at least one depth value that is closer to the viewpoint than a depth value stored in the depth buffer from among respective calculated depth values of the pixel;
   updating the frame buffer of each respective pixel according to an order of decreasing distance between the viewpoint and the extracted depth value, by referring to the respective calculated color value and transparency of the pixel, and updating the depth buffer of each pixel with a minimum value from among the extracted at least one depth value; and
   performing the extracting of the depth value and updating of the frame buffer and the depth buffer for each pixel forming the objects included in the selectively grouped objects, thereby rendering the selectively grouped objects.

7. The method of claim 6, wherein the extracting of the depth value further comprises storing a result of the calculating of the respective depth values, color values, and transparencies for each object included in the selectively grouped objects.

8. The method of claim 7, wherein in the extracting of the depth value, the results of the calculating are stored in order of decreasing distance between the viewpoint and the depth value of each pixel, and in the updating of the frame buffer and the depth buffer of each pixel, the frame buffer is updated in the order that the results of the calculating are stored.

9. The method of claim 1, wherein, in the rendering of the selectively grouped objects and the remaining objects, the selectively grouped objects and the remaining objects are rendered according to an order of decreasing distance from the viewpoint.

10. The method of claim 1, wherein the rendering of the selectively grouped objects and remaining objects comprises:
    calculating respective depth values, color values, and transparencies of each pixel
    forming any one object among the remaining objects; and
    rendering the one object, by updating a depth buffer and frame buffer of each pixel by referring to a result of the calculating of the respective depth values, color values, and transparencies of each pixel forming the one object.

11. A rendering method, comprising:
    selectively grouping transparent objects, using at least one processor, from among a previously grouped plurality of transparent objects distinct from a grouping of opaque objects of a plurality of objects including the transparent objects, wherein the selective grouping of the transparent objects is based upon a determination of whether bounding volumes of the transparent objects, whose ranges of depth values overlap each other, intersect in a 3 dimensional (3D) space; and
    rendering the selectively grouped objects and remaining objects, of the previously grouped plurality of transparent objects not grouped into the selectively grouped objects by the selective grouping of transparent objects, according to an order based on respective distances between each object in the selectively grouped objects and a viewpoint and the respective distances between the remaining objects and the viewpoint,
    wherein in the rendering of the selectively grouped objects and the remaining objects, objects included in the selectively grouped objects are rendered according to an order based on respective distances between the viewpoint and each unit element forming each object included in the selectively grouped objects,
    wherein the grouping of the selectively grouped objects comprises:

sorting transparent objects, of the previously grouped plurality of transparent objects, according to respective distances from the viewpoint;

extracting objects, of the sorted transparent objects, whose ranges of depth values overlap, in the sorted order; and grouping objects, whose bounding volumes intersect in the 3D space among the extracted objects, as the selectively grouped objects.

12. The method of claim 11, wherein in the sorting of the transparent objects according to the respective distances from the viewpoint, the transparent objects are sorted according to an order of decreasing or increasing distance from the viewpoint.

13. The method of claim 1, further comprising rendering opaque objects, of the plurality of objects, before rendering the selectively grouped objects and the remaining objects.

14. The method of claim 1, further comprising displaying a result of the rendering of the selectively grouped objects and remaining objects.

15. At least one non-transitory computer-readable storage medium comprising computer readable code to control at least one processing element to implement the method of claim 1.

16. A rendering system, including at least one processing device, the system comprising:

a grouping unit, using the at least one processing device, to selectively group transparent objects, from among a previously grouped plurality of transparent objects distinct from a grouping of opaque objects of a plurality of objects including the transparent objects, wherein the selective grouping of the transparent objects is based upon a determination of whether bounding volumes of the transparent objects, whose ranges of depth values overlap each other, intersect in a 3 dimensional (3D) space; and a rendering unit to render the selectively grouped objects and remaining objects, of the previously grouped plurality of transparent objects not grouped into the selectively grouped objects by the selective grouping of transparent objects, according to an order based on respective distances between each object in the selectively grouped objects and a viewpoint and respective distances between the remaining objects and the viewpoint, wherein the rendering unit renders the selectively grouped objects according to an order based on respective distances between the viewpoint and each unit element forming each object included in the selectively grouped objects.

17. The system of claim 16, further comprising an input unit to receive graphic data comprising the plurality of objects.

18. The system of claim 16, wherein each unit element is a pixel that is a minimum unit forming respective objects.

19. The system of claim 18, wherein the rendering unit renders the selectively grouped objects and the remaining objects according to an order of decreasing distance from the viewpoint, and renders each selectively grouped object in order of decreasing distance from the viewpoint and each pixel of the respective objects.

20. The system of claim 19, wherein the rendering unit comprises:

a calculation unit to calculate respective depth values, color values, and transparencies of each pixel forming each selectively grouped object; and an update unit to update a depth buffer and frame buffer of each pixel according to an order of decreasing distance between the viewpoint and the respective calculated depth values of the pixels, by referring to a result of the calculation unit.

21. The system of claim 20, wherein the rendering unit further comprises a group buffer to store results of the calculation unit.

22. The system of claim 16, wherein the rendering unit renders opaque objects, of the plurality of objects, before rendering transparent objects.

23. The system of claim 16, further comprising a display to display a rendering result of the rendering unit.

24. A rendering method, comprising:

selectively grouping, using at least one processing device, overlapping transparent objects that have relative distances between each other within respective distance ranges into respective groups of overlapping transparent objects, each respective group of overlapping transparent objects being associated with a different one of the respective distance ranges;

respectively analyzing each group of overlapping transparent objects to identify respective intersecting transparent objects by determining whether bounding volumes of the overlapping transparent objects intersect in a 3 dimensional (3D) space;

respectively rendering each of the plural groups of overlapping transparent objects based on results of the analyzing of each group of overlapping transparent objects;

rendering any remaining transparent objects, of available transparent objects not grouped into the groups of overlapping transparent objects by the selective grouping of overlapping transparent objects, according to respective distances between the remaining objects and the viewpoint; and rendering any opaque objects, wherein the rendering of the opaque objects and the remaining transparent objects are each performed by sequentially altering color values in a color frame buffer as rendering progresses through distances relative to the viewpoint, and wherein the rendering of each plural group of overlapping transparent objects includes altering color values in a respective group buffer for each of the plural groups of overlapping transparent objects, and then sequentially altering color values in the frame buffer based upon consideration of each of the color values of the respective group buffers.

* * * * *